(12) United States Patent
Palmquist

(10) Patent No.: US 6,286,337 B1
(45) Date of Patent: Sep. 11, 2001

(54) TUBING SYSTEM FOR REDUCED PRESSURE FINER

(75) Inventor: Ronald W. Palmquist, Horseheads, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/606,953

(22) Filed: Jun. 29, 2000

(51) Int. Cl.$^7$ .............................. C03C 29/00; C03B 5/16
(52) U.S. Cl. .............................. 65/157; 65/134.9
(58) Field of Search .................. 65/157, 134.9

(56) References Cited

U.S. PATENT DOCUMENTS

| | | | |
|---|---|---|---|
| 5,849,058 | 12/1998 | Takeshita et al. | 65/134.2 |
| 5,851,258 | 12/1998 | Ando et al. | 65/329 |
| 6,119,484 | * 9/2000 | Takei et al. | 65/134.2 |

* cited by examiner

Primary Examiner—Christopher A. Fiorilla
(74) Attorney, Agent, or Firm—Adenike A. Adewuya; Angela N. Nwaneri

(57) ABSTRACT

A tubing system for conveying a molten material through a vacuum housing includes a tubing having a plurality of convolutions which compress as the tubing expands. A plurality of projections disposed along a length of the tubing carries the electrical current which heats the tubing. A plurality of refractory insulation bricks are stacked between the projections. A first seal flange is coupled to an inlet end of the tubing, and a second seal flange is coupled to an outlet end of the tubing. Each seal flange includes a metal seal ring which is adapted to be coupled to the base of the vacuum housing so as to make a sealed contact with the base of the vacuum housing. Each seal flange also includes a refractory seal block which transfers the expansion force of the tubing to the metal seal ring and, thereby, causes the convolutions to compress.

24 Claims, 14 Drawing Sheets

(Section A-A)

TUBING SYSTEM FOR REDUCED PRESSURE FINER

BACKGROUND OF THE INVENTION

1. Technical Field

The invention relates generally to reduced pressure fining, a process for removing trapped bubbles in molten glass. More specifically, the invention relates to a tubing system for conveying molten glass through a vacuum chamber while maintaining an airtight condition within the vacuum chamber.

2. Background Art

In industrial glassmaking, a glass batch is made by mixing in blenders a variety of raw materials obtained from properly sized, cleaned, and treated materials that have been pre-analyzed for impurity. Recycled glass called cullet may also be mixed with the raw materials. For the most commonly produced soda-lime glass, these raw materials include silica ($SiO_2$), soda ($Na_2O$), lime (CaO), and various other chemical compounds. The soda serves as a flux to lower the temperature at which the silica melts, and the lime acts as a stabilizer for the silica. A typical soda-lime glass is composed of about seventy percent silica, fifteen percent soda, and nine percent lime, with much smaller amounts of the various other chemical compounds. The glass batch is conveyed to a "doghouse", which is a hopper at the back of the melting chamber of a glass melting furnace. The glass batch may be lightly moistened to discourage segregation of the ingredients by vibrations of the conveyor system or may be pressed into pellets or briquettes to improve contact between the particles.

The glass batch is inserted into the melting chamber by mechanized shovels, screw conveyors, or blanket feeders. The heat required to melt the glass batch may be generated using natural gas, oil, or electricity. However, electric melting is by far the most energy efficient and clean method because it introduces the heat where needed and eliminates the problem of batch materials being carried away with the flue gases. To ensure that the composition of the molten glass is homogenous throughout, the molten glass is typically stirred together in a conditioning chamber that is equipped with mechanical mixers or nitrogen or air bubblers. The molten glass is then carried in a set of narrow channels, called forehearth, to the forming machines. In the melting chamber, large quantities of gas can be generated by the decomposition of the raw materials in the batch. These gases, together with trapped air, form bubbles in the molten glass. Large bubbles rise to the surface, but, especially as the glass becomes more viscous, small bubbles are trapped in the molten glass in such numbers that they threaten the quality of the final product. For products requiring high quality glass, e.g., liquid crystal displays, the trapped bubbles are removed from the molten glass prior to feeding the molten glass into the forming machines.

The process of removing bubbles from molten glass is called fining. One method for fining glass involves adding various materials known as fining agents to the glass batch prior to mixing in the blenders. The primary purpose of the fining agents is to release the gases in the molten glass when the molten glass is at the proper fining temperature. The released gases then diffuse into gas bubbles in the molten glass. As the bubbles become larger, their relative buoyancy increases, causing them to rise to the surface of the molten glass where they are released. The speed at which the bubbles move through the molten glass may be increased by reducing the viscosity of the molten glass, and the viscosity of the molten glass can be reduced by increasing the temperature of the molten glass. An effective fining agent for atmospheric pressure, glass melting and fining processes should be able to release a large amount of fining gases as the temperature of the molten glass is increased to the temperature range where the viscosity of the molten glass is sufficiently low, i.e., 1300° C. to 1500° C. for soda-lime glass. An example of a fining agent that is suitable for use with soda-lime glass is sodium sulfate ($Na_2SO_4$).

Another method for fining glass involves passing the molten glass through a low pressure zone to cause the bubbles in the molten glass to expand and rise quickly to the surface of the glass. This process is typically referred to as reduced pressure fining or vacuum fining. There are various configurations of reduced pressure finers. U.S. Pat. No. 5,849,058 to Takeshita et al. discloses the general structure of a siphon-type reduced pressure finer. The reduced pressure finer, as shown in FIG. 1, includes a vacuum vessel 1 disposed in vacuum housing 2. The vacuum vessel 1 has one end connected to an uprising pipe 3 and another end connected to a downfalling pipe 4. The uprising pipe 3 and the downfalling pipe 4 are made of platinum, a material that can withstand the high temperature of the molten glass and that is not easily corroded. The vacuum vessel 1, the uprising pipe 3, and the downfalling pipe 4 are heated by electricity. An insulating material 5 is provided around the vacuum vessel 1, the uprising pipe 3, and the downfalling pipe 4. Typically, the insulating material 5 consists generally of insulating bricks and doubles as a structural support for the uprising pipe 3 and the downfalling pipe 4. The bottom ends of the uprising pipe 3 and the downfalling pipe 4 that are not connected to the vacuum vessel 1 extend through the vacuum housing 2 into the storage vessels 6 and 7, respectively. The storage vessel 6 is connected to receive molten glass from a glass melting furnace (not shown).

Flow of molten glass through the uprising pipe 3, the vacuum vessel 1, and the downfalling pipe 4 follows the siphon principle. Accordingly, the liquid surface of the molten glass in the vacuum vessel 1 is higher than the liquid surface of the molten glass in the storage vessel 6, and the pressure in the vacuum vessel 1 is lower than the pressure in the storage vessel 6. The pressure in the vacuum vessel 1 is related to the elevation of the liquid surface of the molten glass in the vacuum vessel 1 with respect to the liquid surface of the molten glass in the storage vessel 6. The height of the liquid surface of the molten glass in vacuum vessel 1 above the liquid surface of the molten glass in the storage vessel 6 is set based on the desired fining pressure and the rate at which molten glass is flowing into the vacuum vessel 1. The molten glass with the trapped bubbles is transferred from the glass melting furnace (not shown) into the storage vessel 6. Because the pressure in the vacuum vessel 1 is less than the pressure in the storage vessel 6, the molten glass in the storage vessel 6 rises through the uprising pipe 3 into the vacuum vessel 1. The pressure in the vacuum vessel 1 is brought to reduced pressure condition of less than the atmospheric pressure, typically ½₀ to ⅓ atmospheric pressure. As the molten glass passes through the vacuum vessel 1 and encounters the reduced pressure, the bubbles in the molten glass expand and quickly rise to the surface of the molten glass, creating a foam layer in the headspace 8. The refined glass descends into the storage vessel 7 through the downfalling pipe 4.

The vacuum housing 2 must be designed to minimize inspiration of air during the fining process. The locations where the uprising pipe 3 and the downfalling pipe 4 exit the vacuum housing 2 must be sealed to ensure an airtight condition within the vacuum housing 2. However, because the uprising pipe 3 and the downfalling pipe 4 expand as they are heated, it is difficult to maintain a reliable seal between the wall of the vacuum housing 2 and the uprising pipe 3 and downfalling pipe 4. For example, the uprising pipe 3 and the downfalling pipe 4 can each grow by over 2 in. when heated up to 1500° C. Thus, there may be a gap where a substantial amount of air at atmospheric pressure can flow into the vacuum housing 2. Further, the insulating bricks 5 around the uprising pipe 3 and the downfalling pipe 4 expand as they absorb heat from the uprising pipe 3 and the downfalling pipe 4, but do so at a lower rate than the uprising pipe 3 and the downfalling pipe 4. Thus, some gaps may open between the insulating bricks 5, which can leave unsupported areas on the uprising pipe 3 and the downfalling pipe 4. The unsupported areas can rupture from the internal pressure the molten glass exerts in the pipes 3, 4.

Very few prior art references have addressed the problem of sealing between the expanding uprising and downfalling pipes and the wall of the vacuum housing and providing adequate support to prevent the pipes from rupturing from internal pressure. U.S. Pat. No. 5,851,258 issued to Ando et al. discloses a backup structure for uprising and downfalling pipes which convey molten material through a vacuum housing and metal bellows for sealing between the pipes and the vacuum housing. FIG. 2 illustrates the backup structure for a pipe 16, which could be the uprising or the downfalling pipe. The backup structure includes a supporting device 30 which is made up of a supporting plate 32 and a push-up means 36. Insulating bricks 28 are arranged around the uprising pipe 16 so as to surround the pipe. The leg portion 12A of the vacuum housing, which contains the pipe 16, is shaped in a rectangular prism-like cylindrical form, and supporting members 40 are fixed at the four corners of the leg portion 12A of the rectangular prism-like cylindrical form. The push-up means 36 connects the leg portion 12A to the supporting plate 32 and urges the supporting plate 32 upwardly to support the bricks 28. Annular flanges 16A are provided at predetermined intervals on the outer circumference of the pipe 16. The bricks 28 are each stacked between the flanges 16A. A recess 28A is formed at an upper surface of each of the bricks 28. The depth of each recess 28A is substantially the same as the thickness of the flange 16A, so that when the bricks 28 are stacked between the flanges 16A, each of the flanges 16A is received in the adjacent recess 28A.

Because the thermal expansion coefficient of the pipe 16, which is made of platinum, is higher than the thermal expansion coefficient of the bricks 28, the elongation of a section of the pipe 16 between adjacent flanges 16A is larger than that of the brick 28 arranged between the same adjacent flanges. Thus, the elongation in the axial direction of the section of the pipe 16 is restricted by the bricks 28, so that the section of the pipe 16 is deformed inwardly in a curved form. The elongation in the axial direction of the pipe 16, as a whole, corresponds to the elongation of the stacked bricks 28. The pipe 16 and bricks 28 expand downwardly against the urging force of the push-up means 36 when thermally expanded. There is a space S between the bricks 28 and the pipe 16 that can accommodate the thermal expansion of the pipe 16 in the circumferential direction. A cylindrical bellows 50 connects the leg portion 12A of the vacuum housing to the supporting plate 32, and the thermal insulation material, i.e., the bricks 28, is received in the cylindrical bellows 50 so as to keep the inside of the vacuum chamber in an airtight condition.

SUMMARY OF THE INVENTION

One aspect of the invention is a tubing system for conveying a molten material through a vacuum housing which includes a tubing having a plurality of convolutions which compress as the tubing expands. A plurality of projections disposed along a length of the tubing carries the electrical current which heats the tubing. A plurality of refractory insulation bricks are stacked between the projections. A first seal flange is coupled to an inlet end of the tubing, and a second seal flange is coupled to an outlet end of the tubing. Each seal flange includes a metal seal ring which is adapted to be coupled to the base of the vacuum housing so as to make a sealed contact with the base of the vacuum housing. Each seal flange also includes a refractory seal block which transfers the expansion force of the tubing to the metal seal ring and, thereby, causes the convolution to compress.

Other aspects and advantages of the invention will be apparent from the following description and the appended claims.

DETAILED DESCRIPTION OF THE INVENTION

Figure 1:
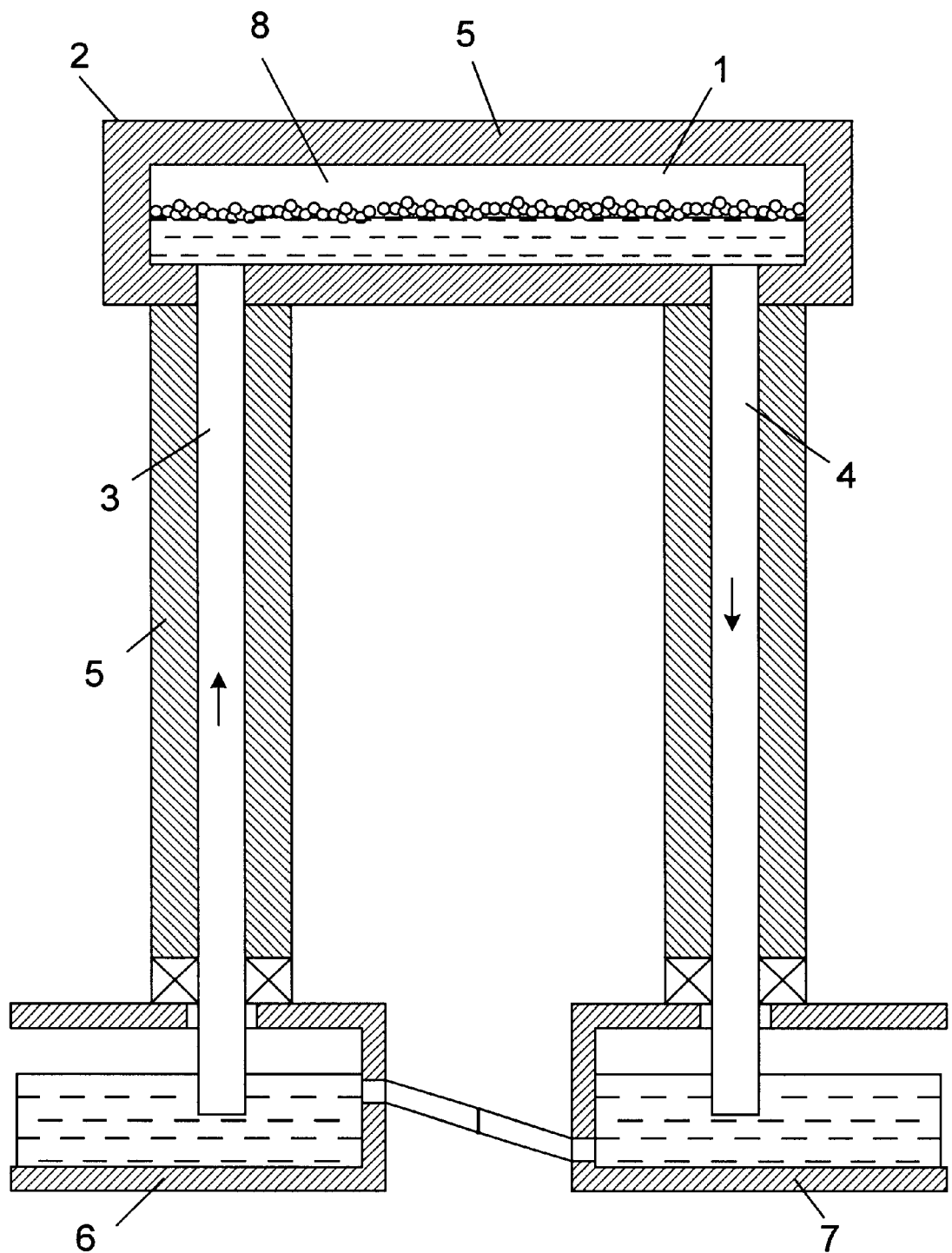
FIG. 1 shows the general structure of a siphon-type reduced pressure finer.
Figure 2:
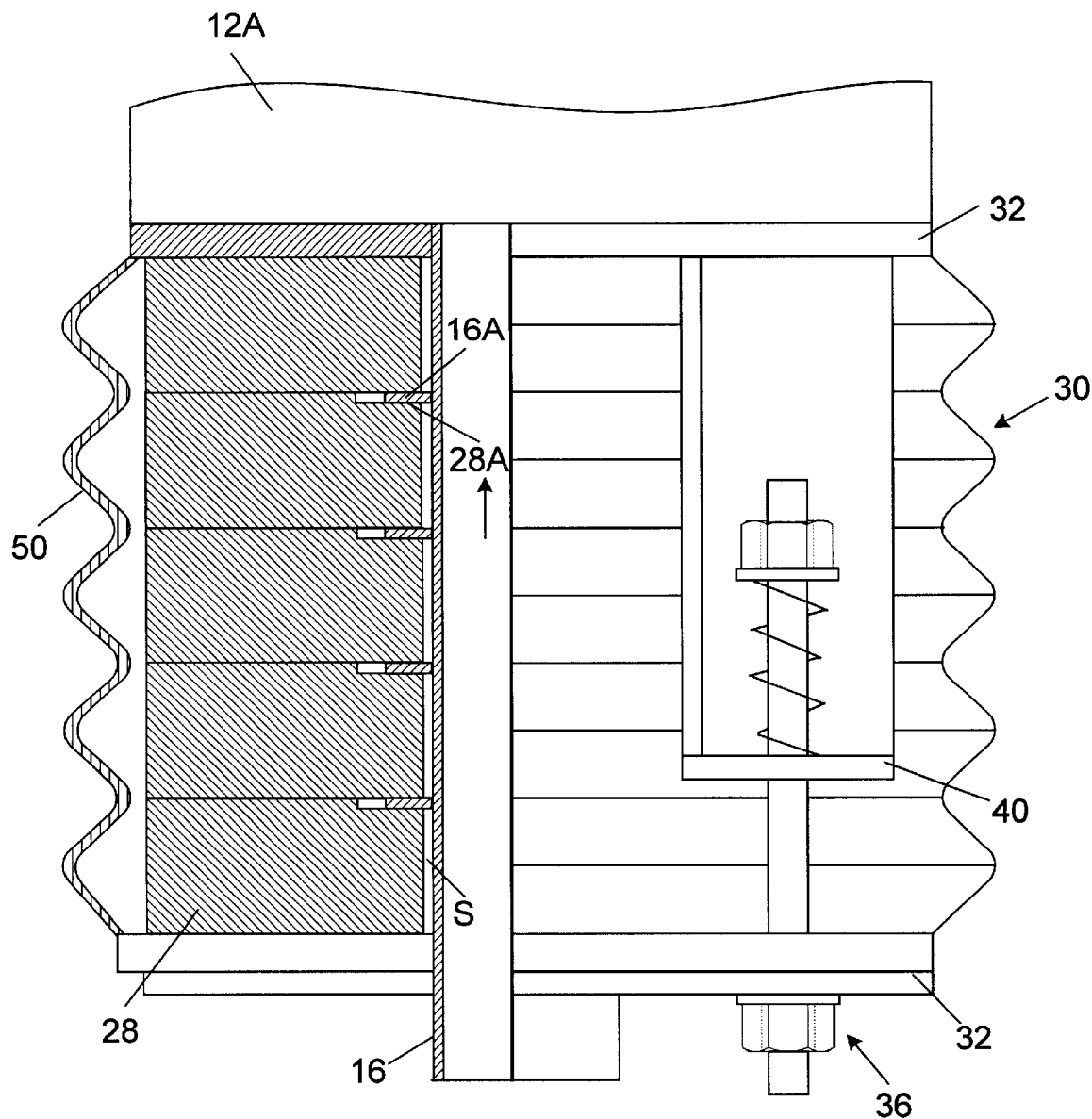
FIG. 2 shows a prior art backup structure for a pipe which conveys a molten material through a reduced pressure finer.
Figure 3:
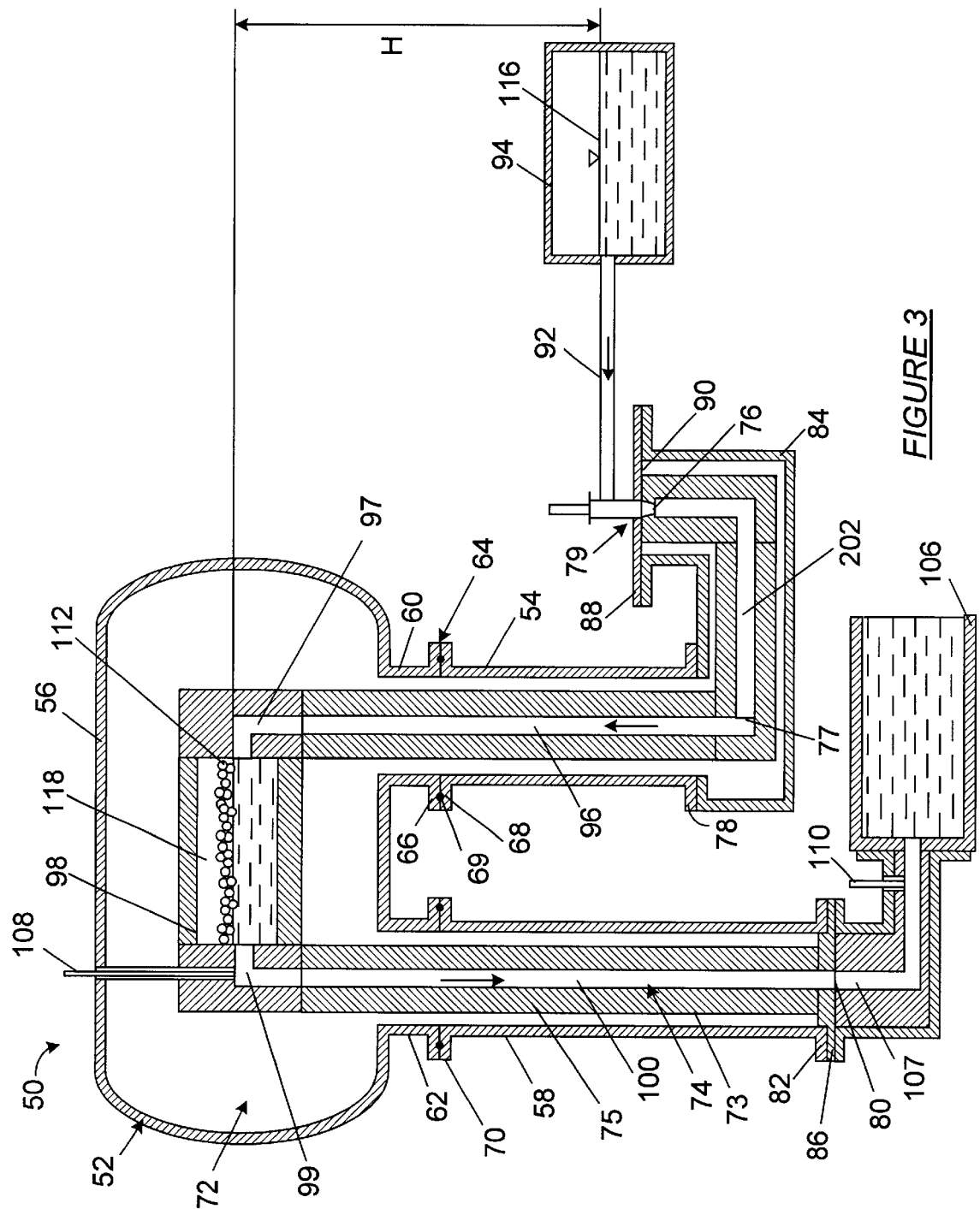
FIG. 3 is a schematic illustration of a reduced pressure finer.

FIG. 3 is a schematic illustration of a reduced pressure finer 50 suitable for removing bubbles trapped in molten glass or other molten material. The reduced pressure finer 50 includes a vacuum housing 52 which includes a riser casing 54, a finer casing 56, and a descender casing 58. The finer casing 56 is a horizontal casing, and the riser casing 54 and the descender casing 58 are vertically upright casings. The casings 54–58 may be generally cylindrical or may have other configuration, e.g., rectangular. The finer casing 56 has an inlet nozzle 60 and an outlet nozzle 62. A sealed connection 64 is formed between the inlet nozzle 60 and the top end of the riser casing 54. This sealed connection 64 may include, for example, a mounting flange 66 on the inlet nozzle 60 that is fastened to a mounting flange 68 on the top end of the riser casing 54 and an O-ring seal 69 that is disposed between the mounting flanges 66 and 68. Similarly, a sealed connection 70 is formed between the outlet nozzle 62 and the top end of the descender casing 58. The vacuum housing 52 also includes an inlet manifold 84, which is connected to the base 78 of the riser casing 54. The inlet manifold 84 may be connected to the base 78 of the riser casing 54 by an airtight weld, by an o-ring seal, or by other means which create an airtight seal.

The riser casing 54, the finer casing 56, the descender casing 58, and the inlet manifold 84 define a continuous vacuum chamber 72 in which a finer chamber 98 and a tubing system 73 are disposed. The finer chamber 98 is entirely contained within the finer casing 56. The tubing system 73 includes a direct-heated tube 74 which conveys molten glass through the continuous vacuum chamber 72. The tubing system 73 also includes a refractory insulation 75 that insulates and provides structural support to the direct-heated tubing 74. Preferably, the direct-heated tubing 74 is made of platinum, or platinum alloy, because platinum has a high melting point and is not easily corroded. The inlet end 76 of the tubing 74 is located in the inlet manifold 84 and communicates with a valve 79 at the entrance 90 of the inlet manifold 84. A seal flange 88 secures the inlet end 76 of the tubing 74 to the inlet manifold 84 and prevents or minimizes inspiration of air into the continuous vacuum chamber 72. The outlet end 80 of the tubing 74 is located at the base 82 of the descender casing 58. A seal flange 86 secures the outlet end 80 of the tubing 74 to the descender casing 58 and minimizes inspiration of air into the continuous vacuum chamber 72.

Another direct-heated tubing 92 connects the entrance 90 of the inlet manifold 84 of the riser casing 54 to a glass melting furnace 94, so as to allow molten glass to be conveyed from the glass melting furnace 94 to the inlet end 76 of the tubing 74. Preferably the tubing 92 is also made of platinum or platinum alloy. The tubing 74 includes a riser tube 96 and a descender tube 100. The riser tube 96 extends from the base 78 of the riser casing 54 to the inlet nozzle 60 of the finer casing 56, where it is connected to the finer chamber 98 by an elbow 97. The descender tube 100 extends from the base 82 of the descender casing 58 to the outlet nozzle 62 of the finer casing 56, where it is connected to the finer chamber 98 by an elbow 99. The outlet end 80 of the descender tube 100 communicates with a stir chamber 106 through a conduit 107. A stirrer (not shown) is disposed in the stir chamber 106 for stirring any fluid received in the stir chamber 106.

In a typical glass fining process, the riser tube 96, the descender tube 100, and the finer chamber 98 are heated to about 1400° C. Molten glass from the glass melting furnace 94 then flows into the riser tube 96 through the valve 79 at the entrance 90 of the inlet manifold 84. The stir chamber 106 is also preheated to about 1400° C., and recycled glass, also known as cullet, is fed into the stir chamber 106 and allowed to melt until the level of glass in the stir chamber 106 reaches the outlet end 80 of the descender tube 100. Instead of, or in addition to, melting cullet in the stir chamber 106, molten glass may be diverted from the tubing 92 to the stir chamber 106 until the level of glass in the stir chamber 106 reaches the outlet end 80 of the descender tube 100. Once the outlet end 80 of the descender tube 100 is immersed in molten glass, the pressure in the finer chamber 98 is slowly reduced so that molten glass is drawn into the finer chamber 98 through the riser tube 96 and the descender tube 100. The pressure in the finer chamber 98 may be reduced by using a vacuum pump (not shown) to draw air out of the finer chamber 98. While glass is drawn into the finer chamber 98, more cullet may be melted in the stir chamber 106 to ensure that the outlet end 80 of the descender tube 100 remains immersed in molten glass. Once the molten glass in the finer chamber 98 reaches the desired level, flow through the tubing 74 is started by drawing glass out of the stir chamber 106.

During operation, molten glass flows through the tubing 74 like a siphon. To ensure that the glass will flow out of the tubing 74, the descender tube 100 must be long enough to raise the glass pressure to atmospheric pressure and overcome the pressure drop due to viscous flow of the glass. Without the pressure drop, the length of the descender 100 would be about the same as the length of the riser tube 96. However, to account for the pressure drop, the descender tube 100 will be longer than the riser tube 96. Hence, there will be a difference in glass level between the inlet end 77 of the riser 76 and the outlet end 80 of the tubing 74. In this embodiment, the size of the riser tube 96 and the descender tube 100 is selected so that this difference in glass level is roughly 2 in. to 4 in, corresponding to the glass level in conventional stir chambers. It should be noted, however, that the difference in glass level will generally be related to the anticipated pressure drop in the system due to viscous flow of the glass. Level probes 108 and 110 are used to sense the glass levels in the finer chamber 98 and after the descender tube 100, respectively. The glass level in the melting furnace 94 is controlled by the rate at which glass batch, i.e., the raw materials used to make glass, is fed into the furnace 94, and the glass level in the finer chamber 98 is controlled by the vacuum in the finer chamber 98 and the flow valve 79. The glass level after the descender tube 100 is not controlled but can be adjusted by changing the temperature in the descender tube 100.

The pressure in the finer chamber 98 is reduced below atmospheric pressure to encourage expansion of the bubbles trapped in the molten glass. To achieve a desired subatmospheric pressure P in the finer chamber 98, the surface 112 of the glass in the finer chamber 98 is elevated a height H relative to the surface 116 of the glass in the glass melting furnace 94. The height H is given by the following expression:

$$H = \frac{P}{\rho g} \qquad (1)$$

where ρ is the density of molten glass and g is the acceleration due to gravity. Thus, for example, if the desired sub-atmospheric pressure P is 0.1 atm and the density of the molten glass is 150 lb/ft$^3$ (2.4 g/cm$^3$), then the surface of the glass in the finer chamber 98 will be elevated a height H of 152 in. (3.86 m) above the glass surface in the glass melting furnace 94. It should be noted that the height H obtained from equation (1) does not take into account the pressure drop across the valve 79. The valve 79 can be adjusted such that the actual height H is less than the height H calculated using equation (1). Generally, the pressure in the continuous vacuum chamber 72 will be controlled by the vacuum pump system to a the desired fining pressure. Then the valve 79 will be adjusted automatically to maintain the glass level in the finer chamber 98 at the desired glass level. The descender tube 100 must be longer than the height H so that there is sufficient pressure to overcome the resistance to flow. When the molten glass encounters the reduced subatmospheric pressure in the finer chamber 98, the trapped bubbles in the molten glass rapidly expand and move to the surface of the glass. It is important to select an appropriate length for the finer chamber 98 that will allow adequate residence time for the trapped bubbles in the glass to rise to the glass surface 112 and break. It is also important that a headroom 118 above the glass surface 112 is provided to accommodate the foam generated as a result of the rapidly expanding bubbles moving to the glass surface 112.

Figure 4A:
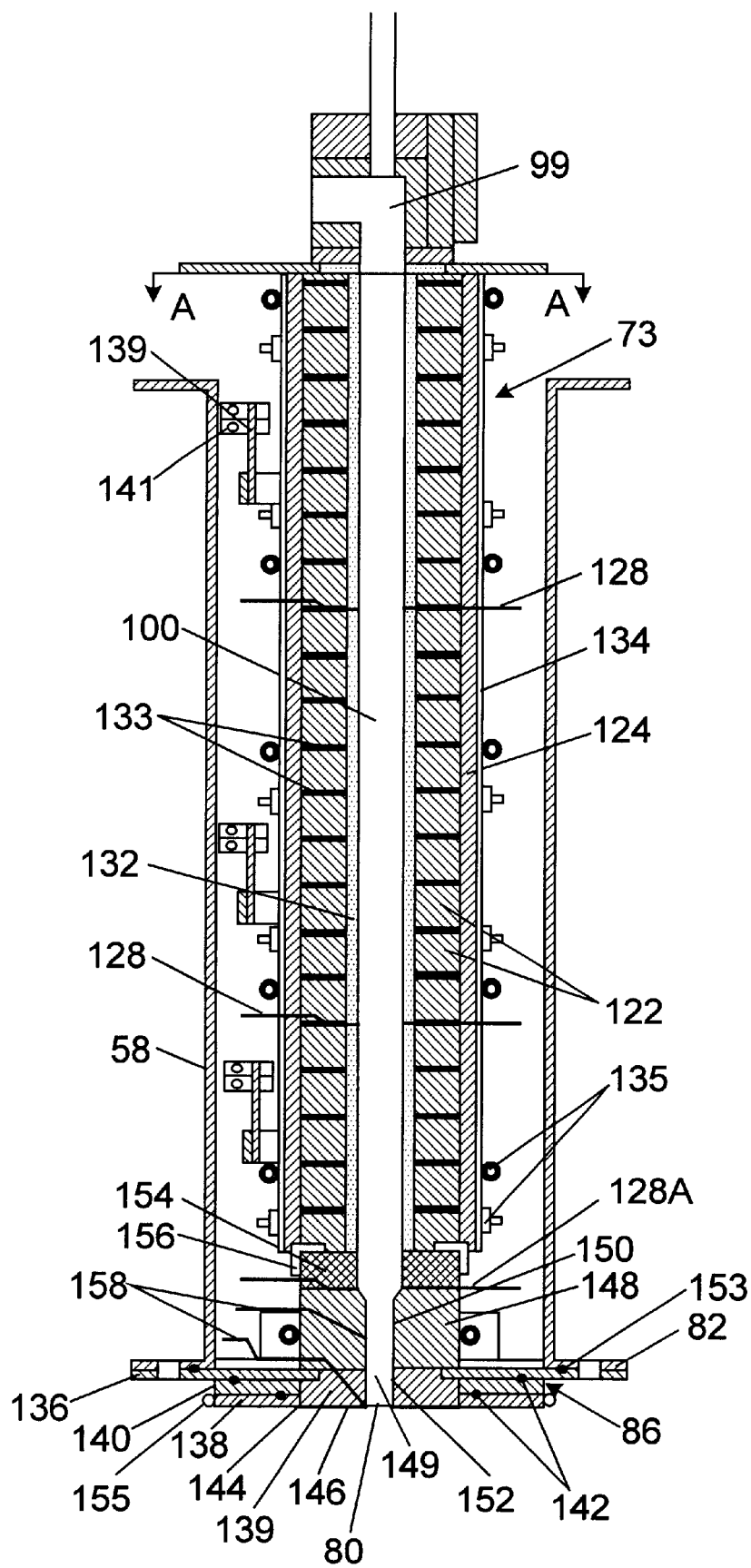
FIG. 4A is a detailed vertical cross section of the descender section of the reduced pressure finer shown in FIG. 3.
Figure 4B:
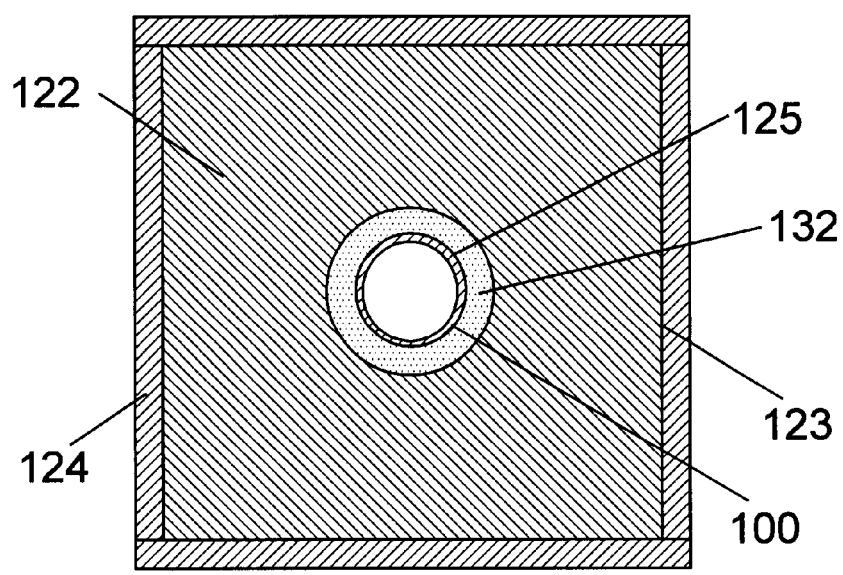
FIG. 4B is a horizontal cross section of the tubing system shown in FIG. 3.
Figure 4C:
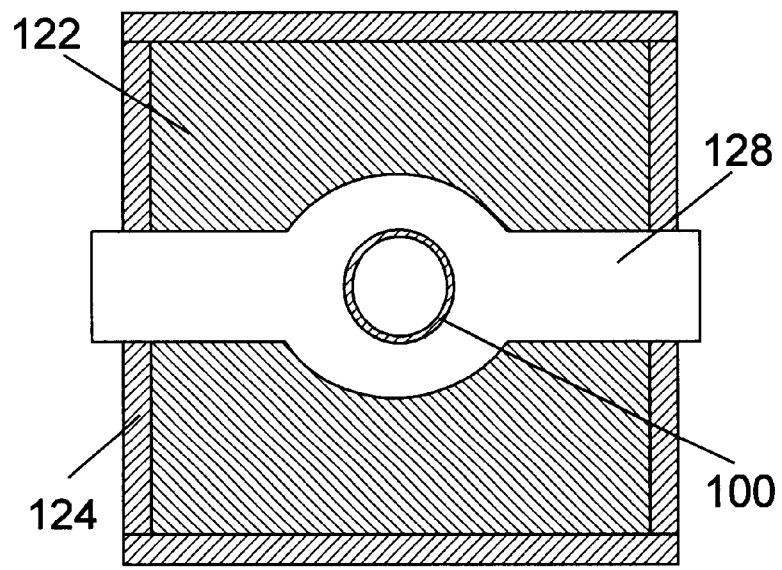
FIG. 4C shows the top view of a power flange.

FIGS. 4A–4B show a detailed vertical and horizontal cross-section of the descender tube 100 as well as the refractory insulation 75 around the descender tube 100. The structure of the riser tube 96 and the refractory insulation 75 around the riser tube 96 is substantially similar to that of the descender tube 100. Therefore, description of the structure of the riser tube 96 and the refractory insulation 75 around the riser tube 96 will be omitted. The descender tube 100 is the longest vertical section of the tubing 74, and poses more challenges in terms of preventing it from buckling under its own weight and thermal expansion. The refractory insulation 75 includes insulation bricks 122 which have their outer surfaces 123 laminated with insulation boards 124 and their inner surfaces 125 bonded to the descender tube 100. The insulation bricks 122 are made of a highly dense alumina material such as sold under product number K-3000 by Babcock and Wilcox, Inc. The insulation boards 124 are made from a less dense, fiber material such as sold under the trade name Duroboard 3000 by Carborundum Corp. The insulating bricks 122 are stacked between power flanges or projections 128, which are distributed along the length of the descender tube 100. FIG. 4C. shows the top view of one of the power flanges 128. The power flanges 128 are typically made of platinum, or platinum alloy, and are welded to the outer diameter of the descender tube 100. One or both of the insulating bricks 122 adjacent each flange 128 may have a notch (not shown) in which the flange 128 is fitted. Electrical current received at the topmost power flange 128 flows to the other power flanges 128. Joule heating of the descender tube 100 results from current flow. The outer edges of the power flanges 128 may be water-cooled so that they do not become excessively hot.

Figure 5:
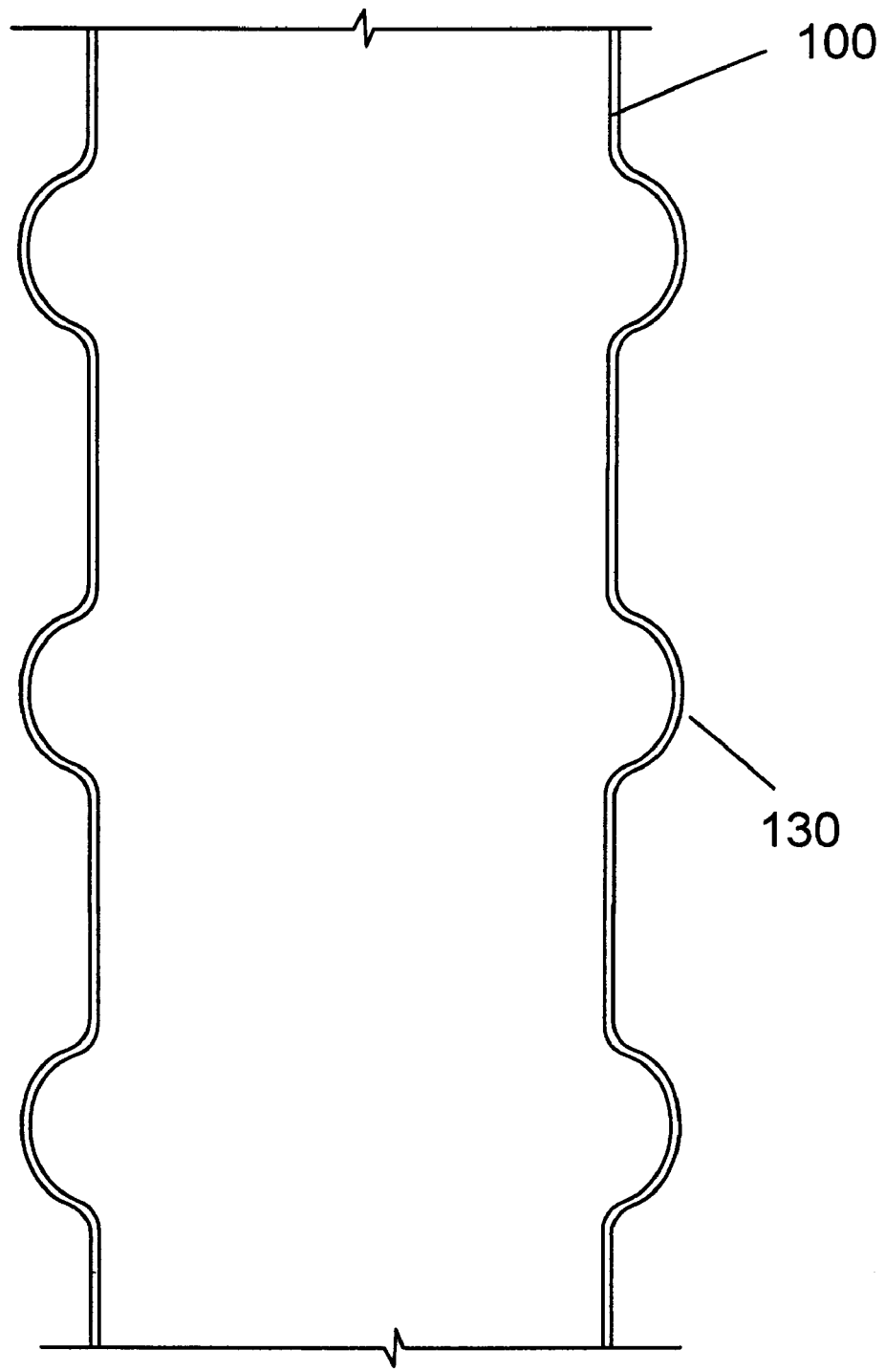
FIG. 5 is an exploded view of a section of the tubing shown in FIG. 4A.

The descender tube 100 expands as it is heated. Thus, several small rolled rings or convolutions 130 are provided in the wall of the descender tube 100 to absorb the thermal expansion. FIG. 5 shows an exploded view of a small portion of the descender tube 100. The rolled rings 130 are typically just a few millimeters deep and are distributed along the length of the descender tube 100, usually about every inch or two along the length of the descender tube 100. The rolled rings 130 compress as the descender tube 100 expands. The insulation bricks 122 are bonded to the descender tube 100 by a castable cement 132 so that there is little relative movement between the insulation bricks 122 and the descender tube 100. This ensures that the thermal expansion of the descender tube 100 is taken up uniformly by the rolled rings 130 (shown in FIG. 5), thus avoiding having just a few of the rolled rings 130 completely collapse. A suitable castable cement would have roughly zero percent thermal expansion on its first heat-up. One example of a suitable castable cement 132 is sold under trade designation BI-57 bubbled alumina by Carborundum Corp. This cement sinters together as it is first heated up so that it has roughly zero percent thermal expansion. The insulation bricks 122 operate almost as hot as the descender tube 100 but do not expand nearly as much as the descender tube 100. A thick layer of fiber cloth 133 is placed between each insulating brick 122 to absorb thermal expansion of the bricks 122. The fiber cloth 133 is preferably alumina paper, such as type APA-2, sold by Zircar Products, Inc. However, any fibrous refractory material may be used.

Figure 4D:
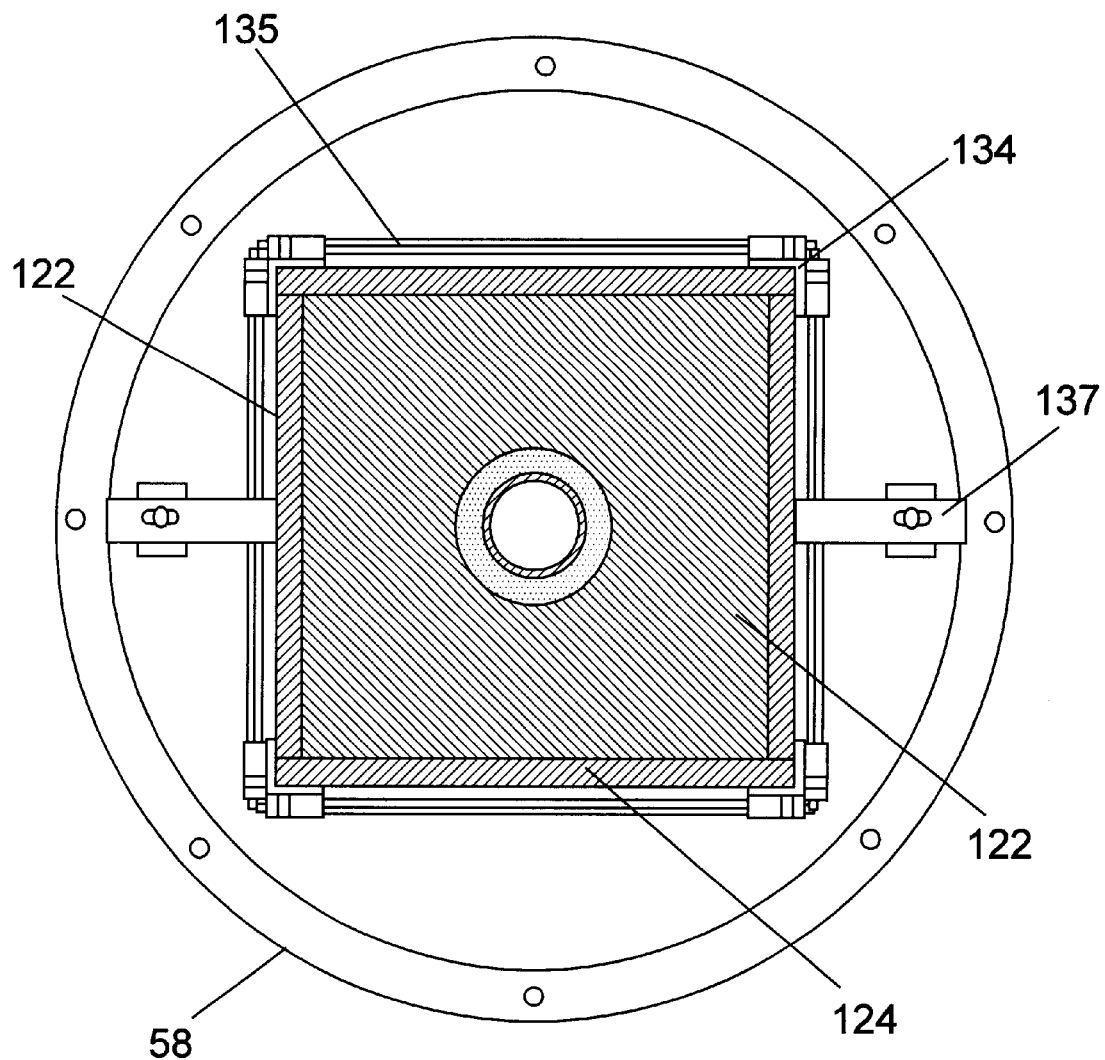
FIG. 4D is a cross section of the descender section shown in FIG. 4A along line A—A.

FIG. 4D shows that the outer corners 127 of the insulating bricks 122 are contained by steel angles 134 so that the insulating bricks 122 do not move. The fact that the insulation bricks 122 do not move is an important feature because then the power flanges 128 on the descender tube 100 are not in danger of being sheared off by relative movement of the bricks 126 with respect to the descender tube 100. The steel angles 134 are fastened together by threaded rods 135. The threaded rods 135 are electrically isolated from each other so that the high current running through the descender tube 100 does not induce current in the encircling threaded rods 135. The weights of the insulation bricks 122 and the steel angles 134 are considerable and preferably should not rest on the power flanges 128. Thus, the steel angles 134 are anchored to the descender casing 58 by supports 137 (shown in FIG. 4D) that project inwardly from the descending casing 58. Hence, the weights of the steel angles 134 and the insulation bricks 122 are supported by the descender casing 58. Alternatively, the insulation bricks 122 and insulation boards 124 may be packed tight against the descender casing 58 so that they are held to the descender casing 58 by friction when the insulation bricks 122 are thermally expanded.

Referring back to FIG. 4A, the seal flange 86 at the outlet end 80 of the descender tube 100 includes a metal seal ring 136, and an electrically conductive ring, e.g., copper ring 138. The metal seal ring 136 and the copper ring 138 are fitted around an insulating brick layer 139. The metal seal ring 136 may be made of a strong metal such as steel. A spacer 140 is disposed between the metal seal ring 136 and the copper ring 138 so that when the metal seal ring 136 is bolted to the descender casing 58, the copper ring 138 is electrically isolated from the descender casing 58. The spacer 140 may be made of a synthetic resin such as sold under the trade name Teflon by E. I. du Pont de Nemours & Co. O-ring seals 142 are disposed between the copper ring 138 and the spacer 140 and between the spacer 140 and the metal seal ring 136 to seal against air leaks. Alternatively, a compressible polytetrafluoroethylene (PTFE) sealing gasket, such as made from material sold under trade name Gore-Tex® by W.L. Gore & Associates, Inc., may be disposed between the copper ring 138 and the metal seal ring 136 to both electrically isolate the copper ring 138 from the metal seal ring 136 and seal against air leaks. The outer edge 144 of an electrically conductive projection, e.g., platinum disk 146, is silver soldered or welded to the copper ring 138.

The seal flange 86 also includes a seal block 148, which is mounted on the insulating brick layer 139. Preferably, the seal block 148 is made of a refractory material that is both strong and thermal-shock resistant. An example of such material is Zirmul, a bonded alumina-zirconia-silica refractory sold by Chas, Taylor Sons Co. The seal block 148 is used to transfer the expansion force of the descender tube 100 to the metal seal ring 136. The expansion force transferred to the metal seal ring 136 also resists external pressure. The seal block 148 sits on the inner edge of the metal seal ring 136. The end portion 149 of the descender tube 100 is necked down to fit within an aperture 150 within the seal block 148, thus ensuring that the expansion force of the descender tube 100 is distributed over the seal block 148. The seal block 148 should be sufficiently thick to restrain the expansion force of the descender tube 100. The end portion 149 of the descender tube 100 also extends into an aperture 152 within the insulating brick layer 139. The outlet end 80 of the descender tube 100 is welded to the platinum disk 146. The platinum disk 146 by itself is not strong enough to withstand the external pressure, but the seal block 148 and the insulating brick layer 139 provide the necessary support required by the platinum disk 146 to withstand the external pressure. The metal seal ring 136 is bolted to the base 82 of the descender casing 58, and an O-ring seal 153 provides an airtight seal between the metal seal ring 136 and the base 82 of the descender casing 58. Copper cables (not shown) carry current from a transformer (not shown) to a copper tube 155 that is attached to the outer edge of the copper ring 138. The copper ring 138 then conveys electrical current to the platinum disk 146 and the power flange 128A on the descender tube 100. Water or other cooling fluid is run through the copper tube 155 to cool the outer edge of the copper ring 138 and prevent the outer edge of the copper ring 138 from being overheated.

It is not customary to re-heat a direct-heated platinum tube after it has been cooled to room temperature because of the risk of cracking the platinum tube or one of the power flanges on the platinum tube. However, if the descender tube 100 is annealed after the rings 130 are rolled into its surface, then the rolled rings 130 would be sufficiently ductile to absorb the slight deformation that occurs during heating and cooling of the descender tube 100. After the descender tube 100 is heated to operating temperature, the stress in the rolled rings 130 is relieved. However, the descender tube 100 tends to shrink as it is cooled down. Thus, a force must be applied to resist contraction of the descender tube 100 as it is cooled down. A hold down block 154 provides the force necessary to keep the descender tube 100 from contracting. At least a portion of the flange 128A adjacent the descender tube 100 must be thick enough so that the flange 128A is not sheared off by the force of contraction. The hold down block 154 lays on top of the power flange 128A above the seal block 148 and is held in place by steel angles 156. The hold down block 154 is made of a strong refractory such as Zirmul, a bonded alumina-zirconia-silica refractory sold by Chas, Taylor Sons Co. This strong refractory is, however, not typically a good thermal insulator. Hence, there will be high heat loss around the region occupied by the hold down block 154, and the glass will be cooled rapidly as it moves through this region. To reduce this rapid cooling, a separate transformer (not shown) is used to provide power between the platinum disk 146 and the power flange 128A directly above the seal block 148. The temperature in the short section of the descender tube 100 between the platinum disk 146 and the power flange 128A can be measured using thermocouples 158, and the output of the thermocouples 158 can be used to control the voltage supplied to the platinum disk 146 and the power flange 128A. Transformer (not shown) provide power between the power flange 128A and the other power flanges 128. A transformer is required between two flanges. The power leads 139 which supply current to the power flanges 128 are anchored to the wall of the vacuum housing 58 by supports 141 (shown in FIG. 4A).

Figure 6A:
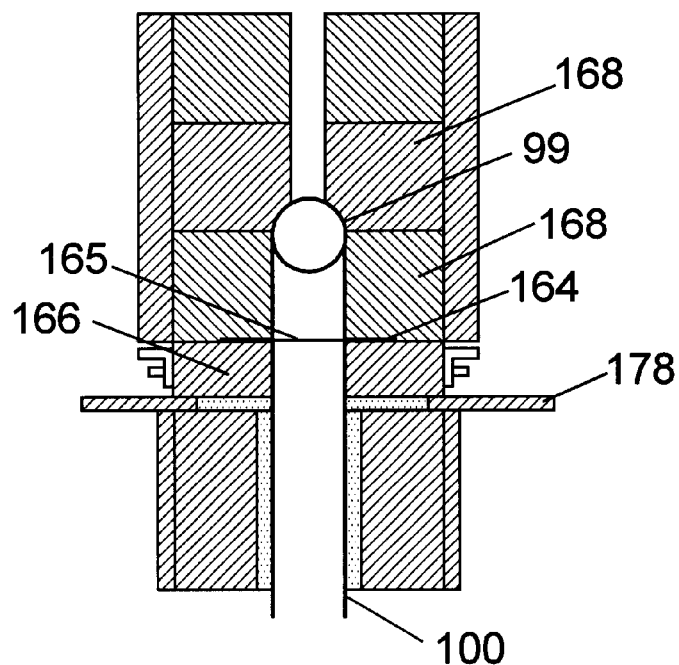
FIGS. 6A and 6B show detailed vertical cross section of the elbow shown in FIG. 3.
Figure 6B:
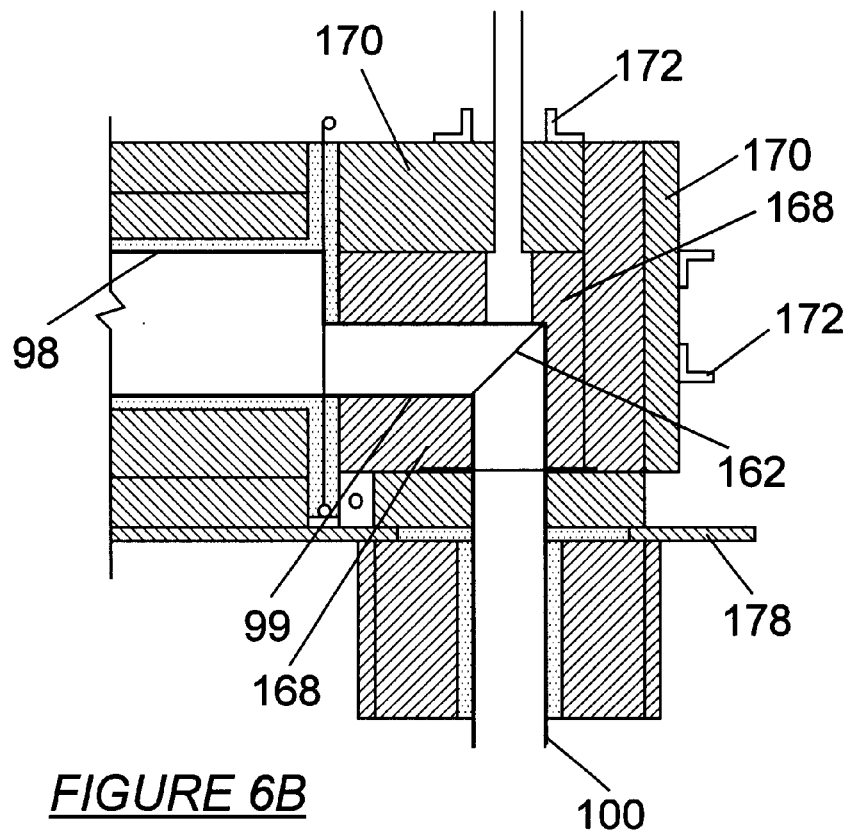

FIGS. 6A and 6B show vertical cross-sections of the elbow 99 which connects the descender tube 100 to the finer chamber 98. Again, the structure of the elbow 99 is similar to the structure of the elbow 97 (shown in FIG. 3) which connects the riser tube 96 to the finer chamber 98. The elbow 99 experiences the same expansion forces and contraction forces as the seal block 148 (shown in FIG. 4A) when the descender tube 100 heats up and cools down, respectively. Thus, the elbow 99 must be able to withstand the thermal expansion and contraction forces of the descender tube 100 without causing the descender tube 100 to crack. When the descender tube 100 is expanding, the vertical upward force will be fairly well distributed over about half the descender tube 100. But when the descender tube 100 is contracting, high local stresses will be induced at the inside corners 162 where a weld in the elbow 99 is located. These high local stresses are a source of failure in the elbow 99. To minimize the local stresses, a small support flange 164 is welded around the base 165 of the elbow 99. The support flange 164 is then fixed in place between two support blocks 166, 168 so that the flange 164 cannot move either up or down. One of the support blocks 166, 168 is notched to accommodate the flange 164, and when the flange 164 is installed, a cement made of refractory material is placed around the flange 164 so that the flange 164 is gripped tightly.

It is important that the support blocks 166, 168 are tightly fitted so that the flange 164 does not bend when forces are applied by the descender tube 100 and the finer chamber 98. In this embodiment, the support block 166 is made of a strong and thermal-shock resistant refractory material such as Zirmul, and the support block 168 is made of a high-temperature resistant material such as high-alumina refractory. The elbow 99 is encased in the support block 168. The support block 168 is insulated by insulating bricks 170. The insulating bricks 170 may be made of a refractory material such as sold under product number K-28 by Babcock and Wilcox, Inc. The insulating bricks 170 must be strong enough to withstand the expansion forces of the descender tube 100 and the finer chamber 98. To hold the elbow 99 in place, brackets 172 made of a strong metal such as steel are placed on the top 174 and side 176 of insulating bricks 170. The brackets 172 are anchored to the finer casing 56 so that relative movement of the elbow 99 with respect to the descender tube 100 and the finer chamber 98 is prevented. The elbow 99 sits on a support 178, which is fixed with respect to the finer casing 56. The support 178 may be made of a strong metal such as steel.

Figure 7:
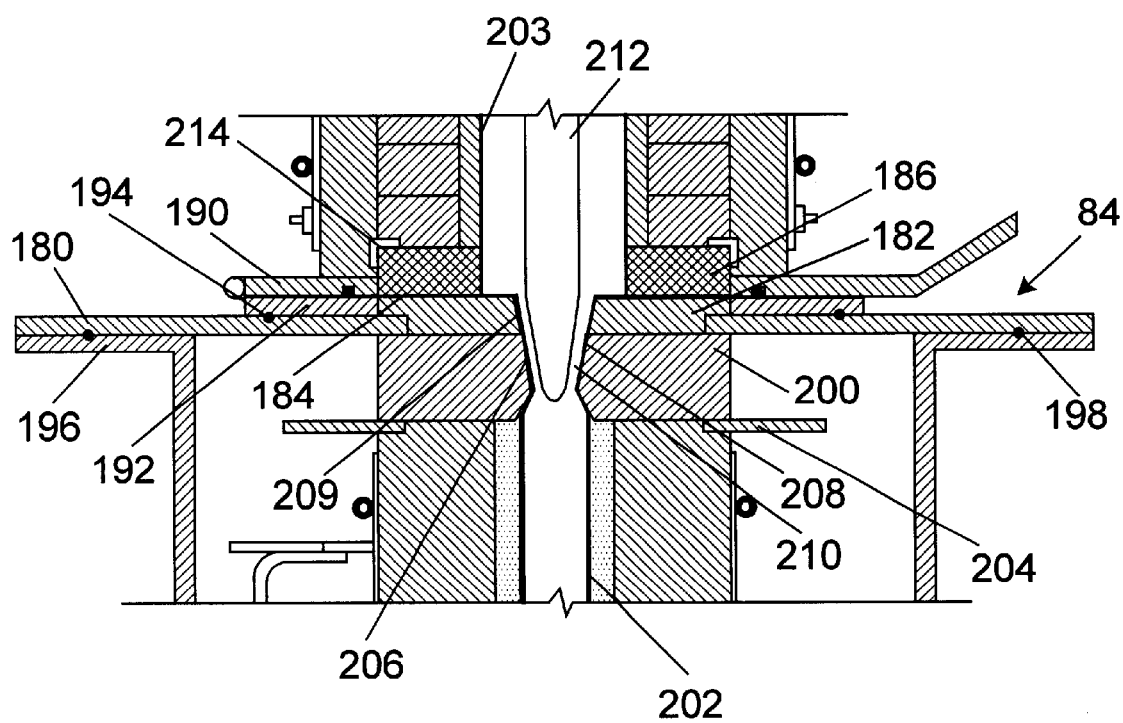
FIG. 7 is a cross section of the inlet manifold shown in FIG. 3.

FIG. 7 shows a detailed cross-section of the inlet manifold 84 at the base 78 of the riser casing 54. The seal flange 88 at the entrance 90 of the inlet manifold 84 is similar to the seal flange 86 at the base 82 of the descender tube 100. The seal flange 88 includes a metal seal ring 180 which is made of a strong metal such as steel. The metal seal ring 180 is fitted around an insulating brick layer 182. A platinum disk 184 is mounted on the insulating brick layer 182, and a hold down block 186 is mounted on the platinum disk 184. The outer edge of the platinum disk 184 is welded to a copper power flange 190, which is also fitted around the insulating brick layer 182. The copper power flange 190 is electrically isolated from the metal seal ring 180 by a spacer 192, which may be made of Teflon or other suitable material. O-ring seals 194 are disposed between the copper power flange 190 and the spacer 192 and between the spacer 192 and the metal seal ring 180 to seal against air leaks. The metal seal ring 180 is bolted to a flange 196 on the inlet manifold 84, and an O-ring seal 198 provides an airtight seal between the metal seal ring 180 and the flange 196. A seal block 200 is mounted below the brick layer 192 and used to transfer the expansion force of the platinum tube 202 to the metal seal ring 180. The tube 202 connects to the riser tube 96 (shown in FIG. 3).

A ring made of a strong metal, e.g., steel ring 204, is disposed below the seal block 200 to provide the force necessary to oppose external pressure and resist contraction forces as the platinum tube 202 is cooled down. A hold down block, similar to the hold down block 154 (shown in FIG. 4A, may also be used to resist the contraction forces of the platinum tube 202. The hold down block 186 provides the force necessary to resist the contraction forces of the tube 203. The end portion 206 of the tube 202 is necked down to fit within apertures 208 and 209 in the seal block 200 and the brick layer 182, respectively. The end portion 206 defines a flow well 210 for receiving molten glass from the tube 92.

A needle 212 is movable within the flow well 210 to control the flow of molten glass through the flow well 210 so that the pressure in the finer chamber 98 can be varied. The flow well 210 and the needle 212 make up the previously mentioned valve 79 (shown in FIG. 3). It is important that the flow well 210 and the riser and descender tubes 96, 100 are completely enclosed within the vacuum housing 52 (shown in FIG. 3). This makes it possible to maintain the pressure within the tubes 96, 100 at a greater level than the pressure inside the continuous vacuum chamber 72, thus ensuring that the platinum tubes 96, 100 do not collapse. Even though the tube 202 is very short, the force needed to deform it is the same as that for a long tube. Thus, the hold down block 186 is held in place by steel angles 214 to enable the hold down block 186 to withstand the contraction force of the tube 203. The seal block 200 and metal seal ring 180 also provide support to the hold down block 186.

Figure 8A:
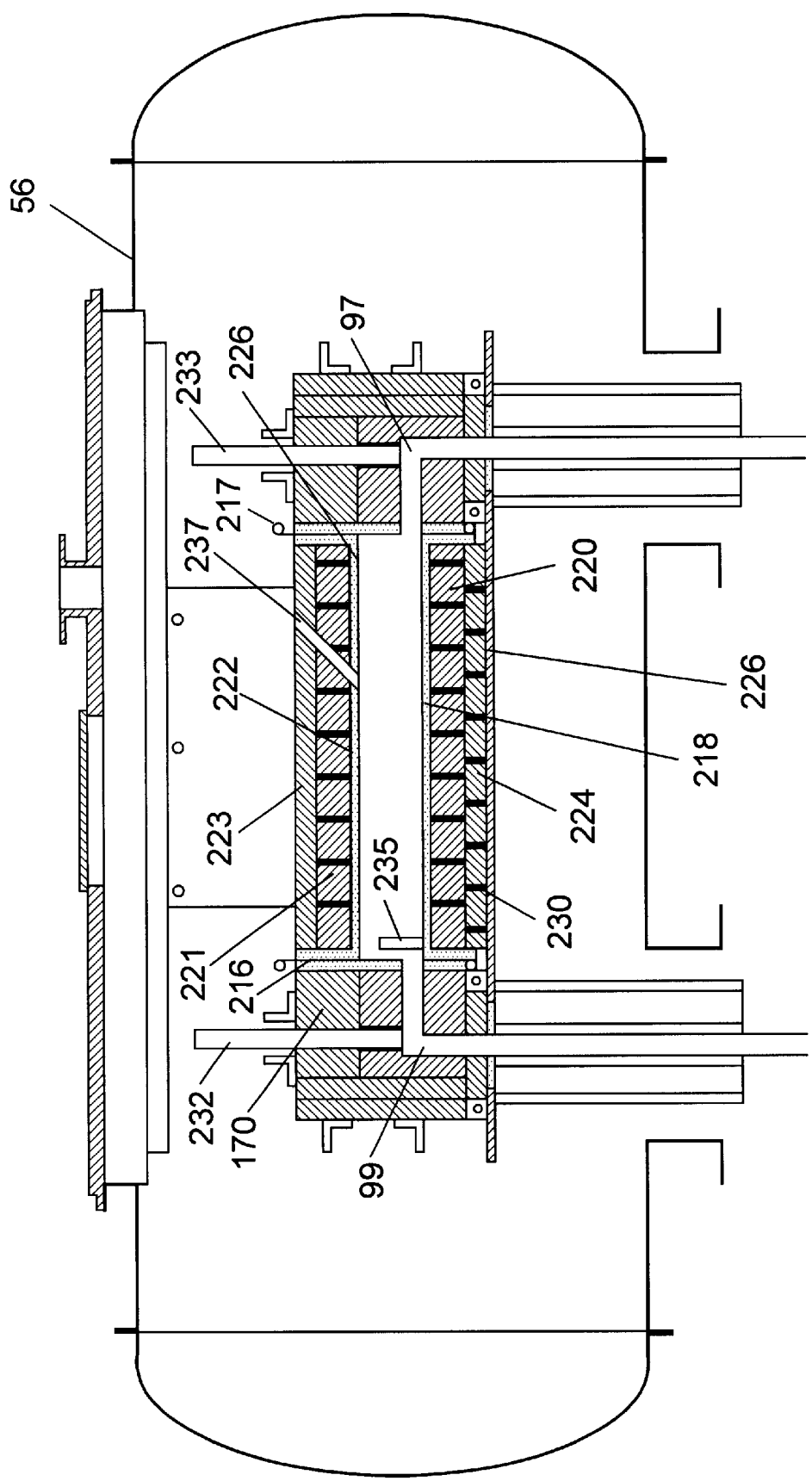
FIG. 8A is a cross section of the finer section of the reduced pressure finer shown in FIG. 3.
Figure 8B:
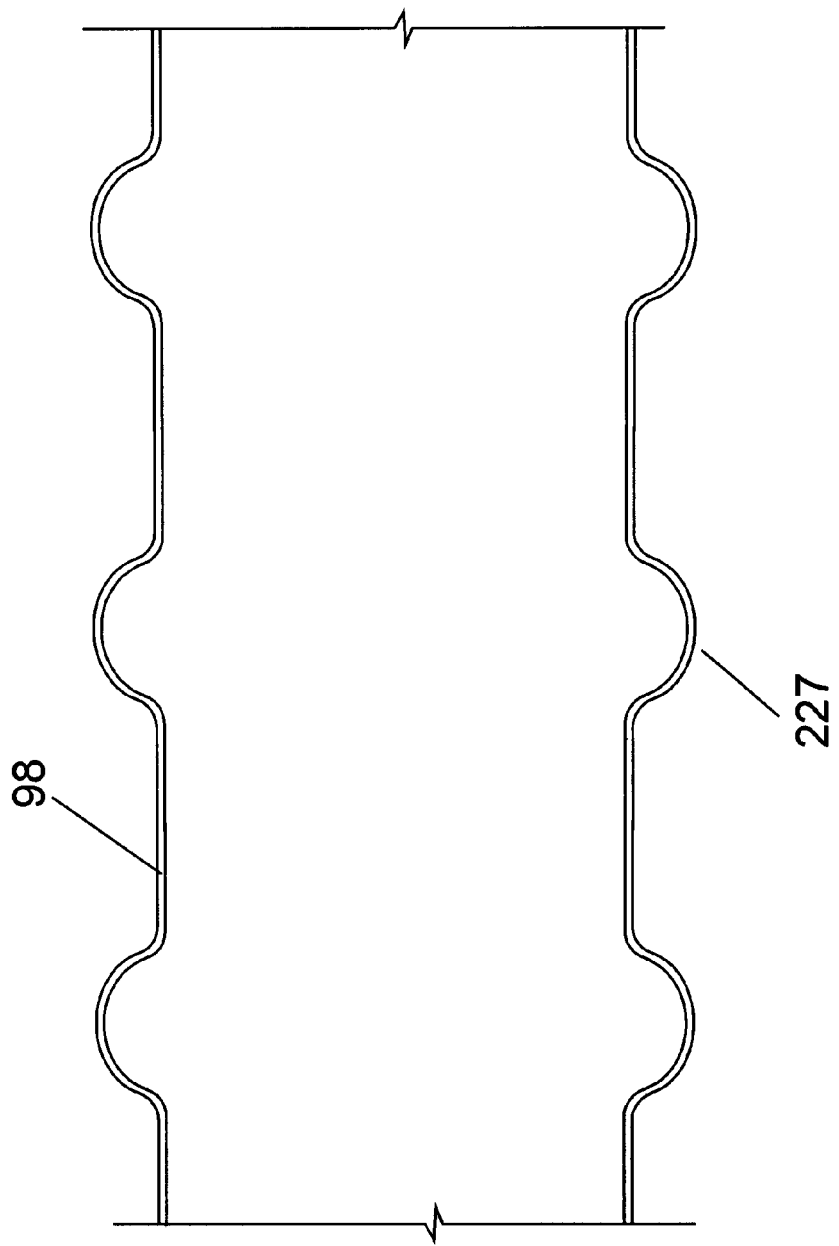
FIG. 8B is an exploded view of a section of the finer chamber shown in FIG. 8A.

FIG. 8A shows a detailed cross-section of the finer casing 56 which houses the finer chamber 98. The finer chamber 98 is much larger in diameter than the riser tube 96 and the descender tube 100. At the ends of the finer chamber 98 are power flanges 216. These power flanges 216 are much larger than the power flanges 128 on the descender and the riser tubes 96, 100 because significantly more current is needed to heat the larger-diameter finer chamber 98. Cooling tubes 217 through which cooling water is circulated are preferably attached to the upper outer edges of the power flanges 216. The finer chamber 98 is surrounded by a layer of castable cement 218 and sits in cradles 220 made of high-alumina refractory or other material that is both resistant to creep and high temperature. Creep is the slow change in the dimensions of a material due to prolonged stress. The roof 222 of the finer chamber 98 is covered with a high-temperature resistant material 221 that is creep-resistant. The sides and bottom and top of the finer chamber 98 are insulated with temperature-resistant insulating bricks 223 and 224, respectively, and overlaid with another insulating layer 226, e.g., insulating board such as sold under the trade name Duroboard 3000 by Carborundum Corp. The wall of the finer chamber 98 has small rolled rings or convolutions 227 (shown in FIG. 8B) to absorb thermal expansion. The brackets 172 on the elbows 99, 97 hold the elbows 99, 97 fixed so that when the finer chamber 98 is heated, the thermal expansion of the finer chamber 98 is absorbed as the rolled rings 227 in the wall of the finer chamber 98 are compressed. A layer of fiber cloth 230 is placed between the vertical joints of the cradles 220, the high-temperature resistant material 221, and the insulating bricks 224. The fiber cloth 230 absorbs the thermal expansion of the cradles 220 and the insulating bricks 224.

In this embodiment, the finer chamber 98 is designed so that it is only half full of glass, but this is not a requirement to make the invention work. The glass level is measured by the level probe 108 (also shown in FIG. 3), which is inserted through the standpipe 232 above the descender tube 100, and adjusted by moving the needle valve 212 (shown in FIG. 7) with respect to the flow well 210 (shown in FIG. 7). The level probe 108 is typically a platinum rod. When the level probe 108 touches the glass surface, an electrical circuit is closed indicating contact with the glass. In practice, the position of the level probe 108 is adjusted by a controller (not shown) so that a selected resistance is maintained in the level probe 108. The standpipe 232 is located downstream of the finer chamber 98 where there should be no foam or bubbles.

The standpipe 232 may be used to convey current to the descender tube 100 and the riser tube 96, respectively. Normally, the current would flow through the finer power flange 216, around the elbow 99, and down to the power flanges 128 on the descender tube 100. A thermal model showed that this current path would cause the inside corner 162 of the elbow 99 to become excessively hot since the electrical current would tend to concentrate there. However, with the standpipe 232 located on the centerline of the descender tube 100, current conveyed down the standpipe 232 to the descender tube 100 does not tend to concentrate and hot spots on the descender tube 100 are substantially eliminated. The short horizontal section of the elbow 99 which connects to the finer chamber 98 does not need to be heated. A standpipe 233 located above the riser tube 96 may similarly be used to convey current to the riser tube 96.

Electrical current may be supplied to the power flanges 128 (shown in FIGS. 4A and 4C) on the tubes 100, 96 and the finer chamber 98 through feed ports (not shown) in the vacuum housing 52. A baffle 235 is positioned in the finer chamber 98 just below the glass surface. The baffle 235 will prevent passage of foam or bubbles on the surface of the glass into the elbow 99. A camera hole 237 is provided in the roof 222 of the finer chamber 98 through which the foam above the glass surface 112 may be observed. The camera hole 237 will typically be lined with platinum.

Figure 9:
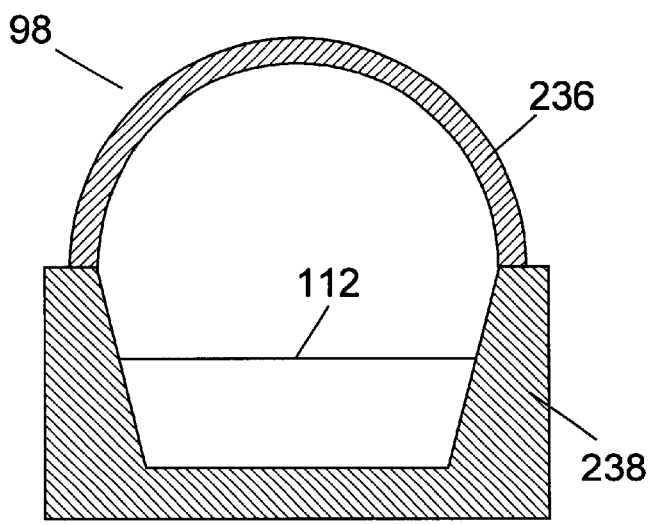
FIG. 9 shows a cross section of the finer chamber shown in FIG. 8.

The finer chamber 98 has a cross-section and a length calculated to eliminate bubbles in molten glass by allowing bubbles to rise to the surface of the molten glass. The cross-section is also selected such that there is adequate headroom 118 above the glass surface 112 for foam. The finer chamber 98 may have a circular cross-section. FIG. 9 shows an alternative cross-section 234 for the finer chamber 98. This cross-section 234 minimizes the depth of the glass. This is more effective for removing the bubbles. The cross-section 234 has a domed roof 236, which is preferable to prevent the sag or collapse of the roof. The channel 238 in contact with the glass is lined with platinum. The roof 236 in most cases should also be lined with platinum to prevent attack by corrosive vapors. The domed roof 236 may be circular, but a catenary shape is more resistant to sag due to creep of the platinum lining. Furthermore, it may be necessary at elevated temperatures to pin the roof of the finer chamber 98 to the refractory above the finer chamber 98 to help prevent sagging.

Figure 10A:
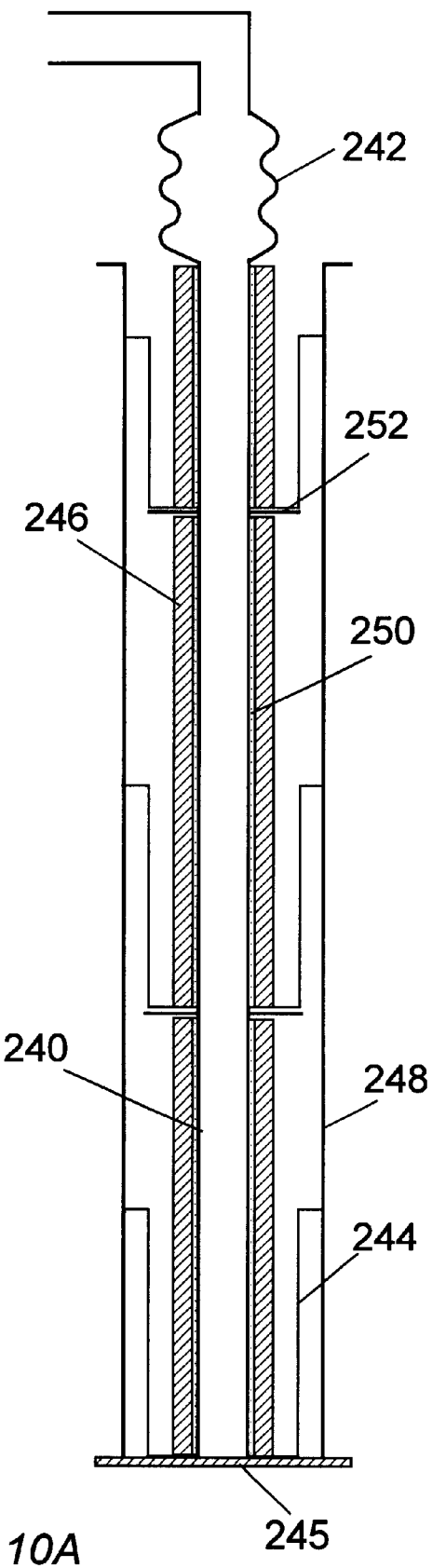
FIGS. 10A–10C show alternate tubing configurations for the reduced pressure finer shown in FIG. 3.
Figure 10B:
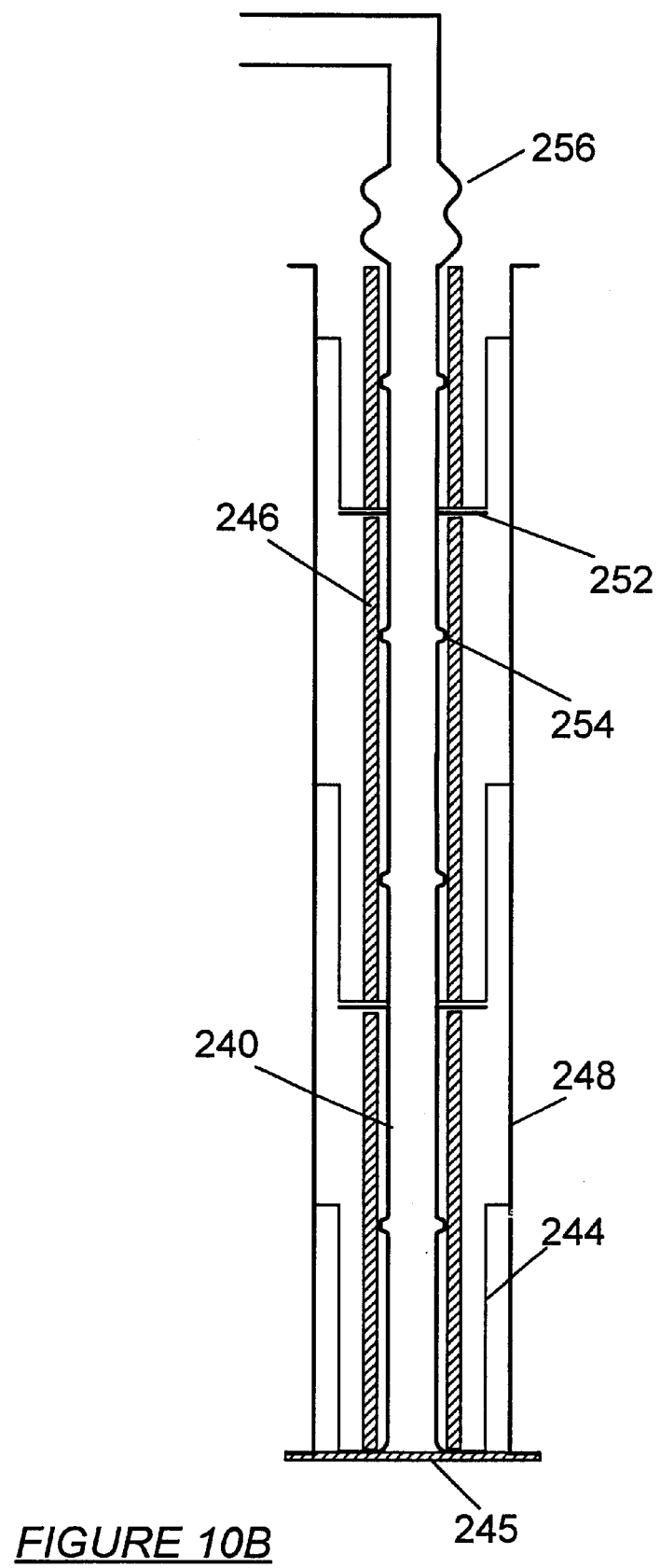

Referring back to FIG. 4A, the top end of the descender tube 100 is restrained by the fixed elbow 99 and the bottom end of the descender tube 100 is fixed to the descender casing 58 by the seal flange 86 so that the expansion of the descender tube 100 is absorbed internally by means of the small rolled rings 130 (shown in FIG. 5) in the wall of the descender tube 100. FIGS. 10A and 10B show how thermal expansion can be accommodated in a tube 240 that does not include small rolled rings. In FIG. 10A, a large metal bellows 242 is provided at the top end of the tube 240 to absorb expansion of the tube 240. It is necessary that the ends of the tube 240 are adequately supported to resist the large forces needed to compress the bellows 242. The support members (not shown) used to anchor the insulation bricks 246 around the tube 240 to the wall of the casing 248 must be raised as the tube 240 expands. The power leads 244 that supply electrical current to the power flanges 252 on the tube 240 must also be raised as the tube 240 expands so that flanges 252 are not sheared off. It should be noted that because the insulation bricks 246 expand less than the tube 240, some gaps may open between the insulation bricks 246. These gaps could leave unsupported areas where the tube 240 might rupture from internal pressure, or where a cold spot could occur in the molten glass passing through the tube. However, if the insulation bricks 246 are bonded to the tube 240 by a castable cement 250, the castable cement 250 may lift the insulation bricks 246 as the tube 240 expands. It should be noted, however, that the large metal bellows 242 at the top of the tube 240 would have large radial thermal gradients that can promote reboil of the molten glass. An external heater (not shown) may be provided to prevent large thermal gradients at the bellows 242. The bellows 242 could also be subjected to oxidation and would tend to creep or sag. Fiber reinforcement such as sold under trade name Fiberfrax by sold by Carborundum, Corp., could be placed between the convolutions of the bellows 240 to help prevent sagging.

In FIG. 10B, the insulation bricks 246 are allowed to push up from the bottom, for example, by not bonding them to the tube 240. As the insulation bricks 246 push up, the power flanges 252 are lifted up. Again the supports (not shown) that anchor the insulation bricks 246 to the wall of the casing 248 must be moved up as the insulation bricks 246 push up. Some expansion rings 254 are required to absorb expansion of the tube 240 that occurs between power flanges 252. The expansion rings 254 are soft in comparison to the small rolled rings 130 (shown in FIG. 5), i.e., they have a much larger radius than the small rolled rings and require much less force to compress them. A small bellows 256 is still needed at the top of the tube 240 to absorb the expansion at the top end of the tube 240.

Figure 10C:
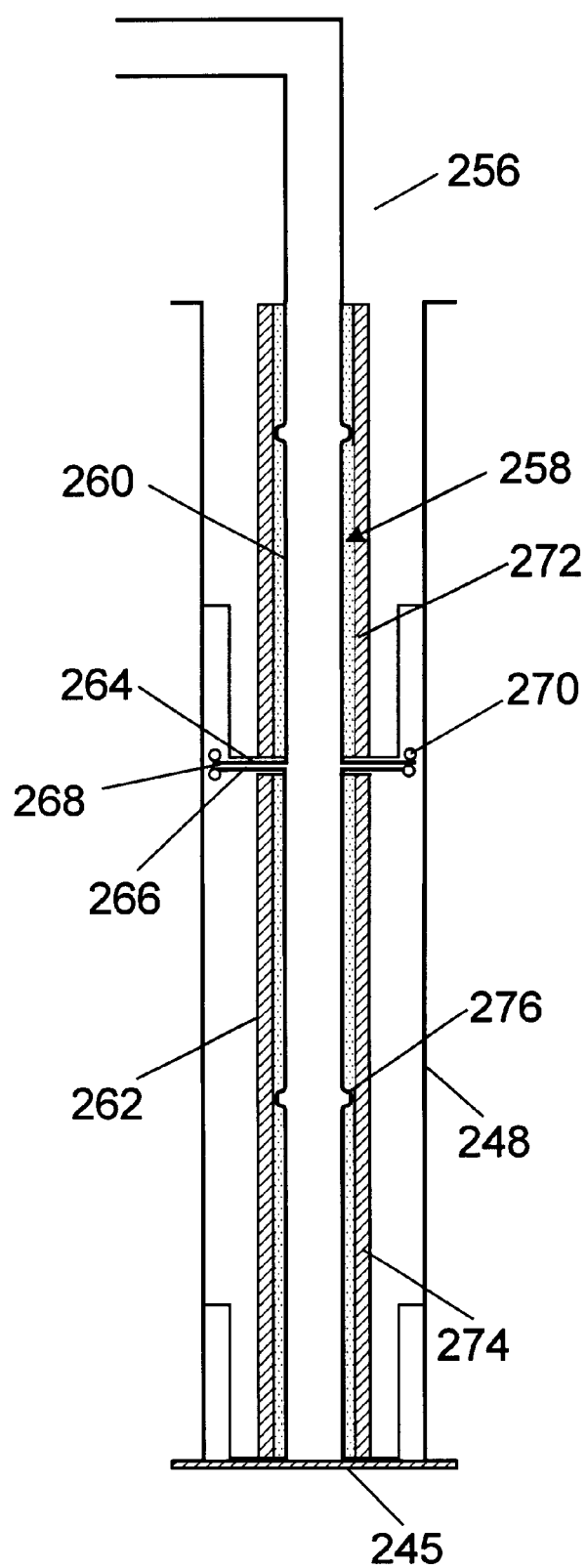

FIG. 10C shows a tube 258 that is fabricated in two sections 260, 262. The adjacent ends of the sections 260, 262 have circular disks 264, 266 which are used as power flanges. The tube sections 260, 262 expand but do not touch. As a result, glass flows into the open joint 268 between the disks 264, 266. The circular disks 264, 266 have cooling tubes 270 welded to their outer edges. As such, the glass that flows into the open joint 268 will freeze. Typically, the open joint 268 is so small that glass does not ooze out of the open joint 268. Differential expansion of the insulating bricks 272, 274 and the tube sections 260, 262 are addressed by providing expansion rings 276 between flanges. The power to operate the tube sections 260, 262 is provided by separate transformers (not shown).

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A tubing system for conveying a molten material through a vacuum housing, the tubing system comprising:
    a tubing having a plurality of convolutions which compress as the tubing expands;
    a plurality of projections disposed along a length of the tubing, the projections for carrying the electrical current which heats the tubing;
    a plurality of refractory insulation bricks stacked between the projections;
    a first seal flange coupled to an inlet end of the tubing; and
    a second seal flange coupled to an outlet end of the tubing;
    wherein each seal flange comprises:
        a metal seal ring adapted to be coupled to the base of the vacuum housing so as to make a sealed contact with the base of the vacuum housing; and
        a refractory seal block coupled to the metal seal ring and the tubing, the refractory seal block for transferring the expansion force of the tubing to the metal seal ring, thereby causing the convolutions to compress.

2. The tubing system of claim 1, wherein each seal flange further includes an electrically conductive ring which conducts electrical current to a projection on the tubing.

3. The tubing system of claim 2, wherein the electrically conductive ring is electrically isolated from the metal seal ring.

4. The method of claim 3, further comprising a seal for sealing between the electrically conductive ring and the metal seal ring.

5. The tubing system of claim 1, further comprising a seal sealing between the metal seal ring and the base of the vacuum housing.

6. The tubing system of claim 1, wherein each seal flange further includes means for resisting contraction forces of the tubing.

7. The tubing system of claim 6, wherein the means for resisting contraction forces of the tubing includes a hold-down refractory block coupled to the refractory seal block.

8. The tubing system of claim 6, wherein the means for resisting contraction forces of the tubing includes a metal ring coupled to the refractory seal block.

9. The tubing system of claim 1, wherein the tubing is made of platinum.

10. The tubing system of claim 1, wherein the inner surfaces of the insulation bricks adjacent the tubing are secured to the tubing by a castable cement.

11. The tubing system of claim 1, wherein a fibrous refractory material is disposed between adjacent insulation bricks to absorb thermal expansion of the insulation bricks.

12. The tubing system of claim 1, wherein the outer surfaces of the insulation bricks are laminated with an insulation material.

13. The tubing system of claim 10, further comprising means for anchoring the insulation bricks to the wall of the vacuum housing.

14. The tubing system of claim 9, wherein the projections are made of platinum and are secured to the outer diameter of the tubing.

15. The tubing system of claim 1, wherein the second seal flange includes an electrically conductive projection which cooperates with one of the projections on the tubing to heat the inlet end of the tubing.

16. The tubing system of claim 1, further comprising a valve for controlling flow of the molten material into the inlet end of the tubing.

17. The tubing system of claim 1, wherein the tubing comprises a first vertical section, a second vertical section, and a horizontal section, and wherein a pair of elbows couple opposite ends of the horizontal section to the vertical sections.

18. The tubing system of claim 17, wherein a support flange is fixed to the end of each elbow connected to the vertical section and fixedly secured between the insulation bricks adjacent the elbow.

19. The tubing system of claim 17, further comprising means for anchoring the elbows to the wall of the vacuum housing.

20. The tubing system of claim 17, wherein the diameter of the horizontal section is larger than the diameter of the vertical sections.

21. The tubing system of claim 17, wherein the second vertical section includes the outlet end of the tubing and is longer than the first vertical section.

22. The tubing system of claim 17, wherein a standpipe is provided on each elbow for receiving a level probe.

23. The tubing system of claim 22, wherein the standpipe conveys electrical current to the tubing.

24. A tubing system for conveying a molten material through a vacuum housing, the tubing system comprising:
- a tubing having a plurality of convolutions which compress as the tubing expands;
- a plurality of projections disposed along a length of the tubing, the projections for carrying the electrical current which heats the tubing;
- a plurality of refractory insulation bricks stacked between the projections;
- a first seal flange coupled to an inlet end of the tubing; and
- a second seal flange coupled to an outlet end of the tubing;
- a valve for controlling flow of the molten material into the inlet end of the tubing;
- wherein each seal flange comprises:
  - a metal seal ring adapted to be coupled to the base of the vacuum housing so as to make a sealed contact with the base of the vacuum housing; and
  - a refractory seal block coupled to the metal seal ring and the tubing, the refractory seal block for transferring the expansion force of the tubing to the metal seal ring, and thereby causing the convolution to compress.

* * * * *